United States Patent [19]

McMurtry

[11] 4,451,892

[45] May 29, 1984

[54] METHOD OF AND APPARATUS FOR MEASURING DISTANCES IN NUMERICALLY CONTROLLED MACHINE TOOLS

[76] Inventor: David R. McMurtry, 'Undercroft', Tabernacle Pitch, Wotton-Under-Edge, Gloucestershire, England

[21] Appl. No.: 229,052

[22] Filed: Jan. 27, 1981

[30] Foreign Application Priority Data

Jan. 31, 1980 [GB] United Kingdom ................ 8003285

[51] Int. Cl.³ ............................................. G06F 15/46
[52] U.S. Cl. ................................... 364/474; 318/572; 408/13
[58] Field of Search ........................ 364/474, 475, 561; 408/6, 8, 11, 12, 13; 82/2 B; 318/571, 653, 662, 663, 572

[56] References Cited

U.S. PATENT DOCUMENTS

| | | | |
|---|---|---|---|
| 3,573,588 | 4/1971 | Nurnberg | 318/571 |
| 3,698,268 | 10/1972 | Cutler | 364/475 |
| 3,818,334 | 6/1974 | Rosenberg | 408/11 |
| 3,963,364 | 6/1976 | Lemelson | 408/8 |
| 3,986,010 | 10/1976 | Lankford et al. | 318/572 |
| 4,278,784 | 11/1981 | Schmall | 318/662 |

*Primary Examiner*—Gary Chin
*Attorney, Agent, or Firm*—Spencer & Frank

[57] ABSTRACT

A numerically controlled machine tool having a tool secured to a support for machining a surface of a workpiece. The tool is also used for sensing the workpiece surface for measuring the distance between the workpiece surface and a datum surface. To this end, the tool is at first moved to a position clear of the workpiece surface and an electric circuit between the tool and the workpiece switched on. The tool is then moved toward the workpiece surface by a control system adapted to continually read the position of the tool by means of a counter. When the tool touches the workpiece the circuit is made and produces a signal used to read the instantaneous content of the counter into a computer. The computer determines the difference between the actual and demanded dimension of the workpiece surface and corrects the next machining position of the tool accordingly. In a modification, the signal generated when the tool touches the workpiece is produced by a piezo-electric crystal embodied in the tool and adapted to sense the force on the tool when the latter engages the workpiece. In a further modification a clamp bolt securing the tool to the support is released to allow the tool to slide on the support as the support continues to move after the tool engages the workpiece surface. The commencement of this sliding is used to produce the signal. The extent of the sliding may be used to measure the difference between the actual and demanded dimension.

13 Claims, 6 Drawing Figures

METHOD OF AND APPARATUS FOR MEASURING DISTANCES IN NUMERICALLY CONTROLLED MACHINE TOOLS

BACKGROUND OF THE INVENTION

This invention relates to a method of an apparatus for measuring distance in numerically controlled machine tools.

It is known in numerically controlled machine tools to carry out both machining operations and measuring operations on a workpiece held in the machine. For the purpose of the measuring operation, the known machine includes a probe having a stylus whereby to sense a selected surface of the workpiece. The probe outputs a signal response to such sensing. The signal is communicated to a numerical position control system of the machine thereby enabling that system to determine the position of the probed surface and thus the dimension of that surface in relation to a predetermined datum. When the probe is to be taken into use it is necessary to remove the last used tool from the operative position and introduce the probe in the position previously occupied by the tool. For example, if the tool and the probe are mounted at respective stations of a multi-station turret, the latter has to be indexed to bring the probe into the operative position. If the machine has an automatic tool change mechanism which moves the tools between the tool holder of the machine and a magazine of such tools, the tool has to be returned to the magazine and the probe has to be moved from the magazine to the tool holder before the measuring operation can be carried out. The need to exchange the tool for the probe and vice versa can be a source of delay, and is otherwise disadvantageous, especially in the case where the measuring operation has to be carried out between successive machining operations. Further, different surfaces of the same workpiece often have different shapes or orientations, requiring differently-shaped tools and correspondingly different styli for sensing of those surfaces. This, in turn, may require different probes to be held in said turret or said magazine.

SUMMARY OF THE INVENTION

The invention overcomes or reduces the above disadvantages in that it uses the tool both for the machining and for the sensing function. In other words, the probe is dispensed with. This has the special advantage that inasmuch as the tool is necessarily shaped in accordance with the shape or orientation of the surface concerned, it is often ideally suited for performing the sensing function and the need to hold probes with different styli, or a single probe with a stylus movable to different orientations, is generally avoided.

BRIEF DESCRIPTION OF THE DRAWINGS

Examples of the invention will now be described with reference to the accompanying drawings wherein.

DESCRIPTION OF THE PREFERRED EMBODIMENTS

Figure 1:
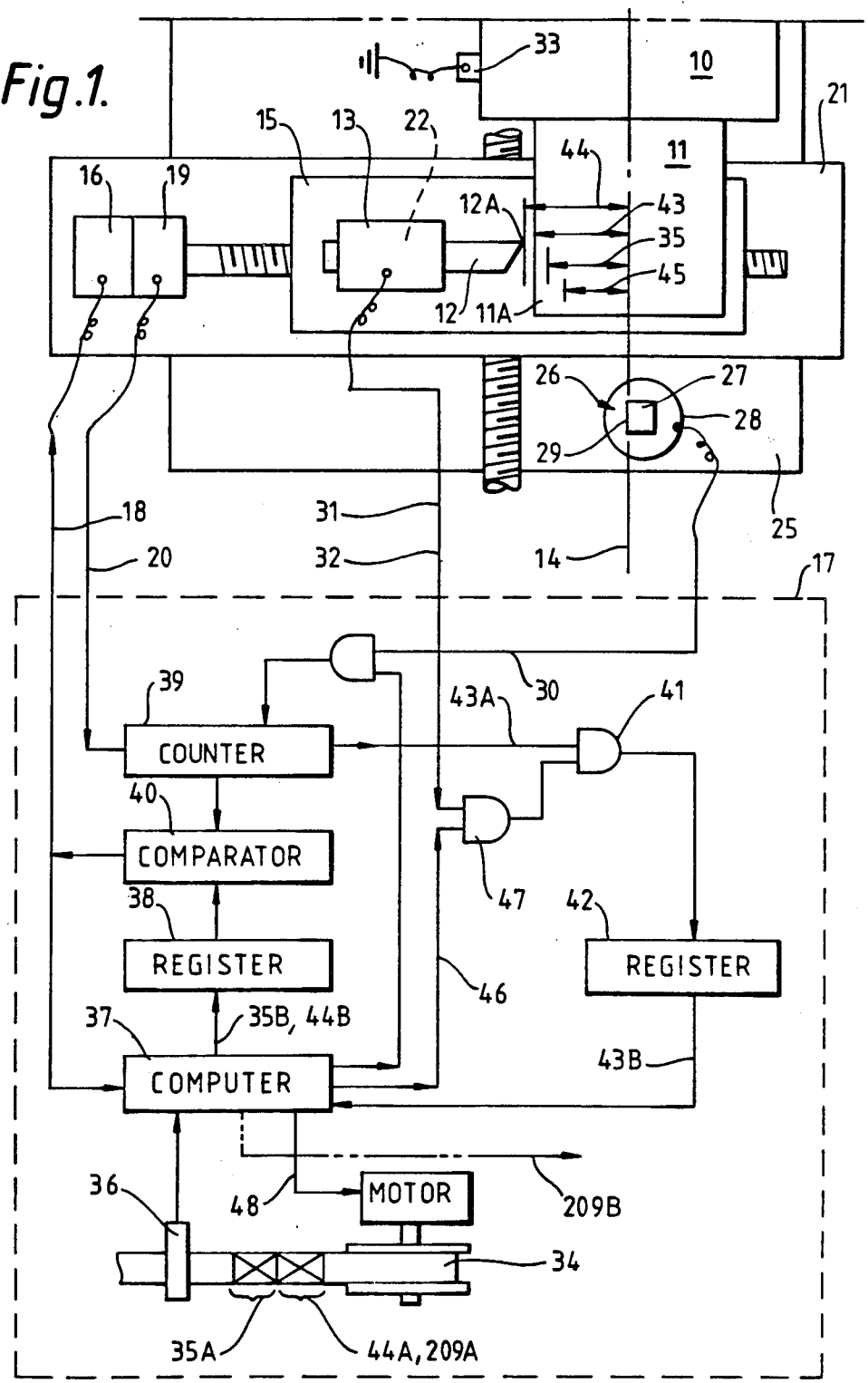
FIG. 1 is a plan view of a numerically controlled lathe.
Figure 2:
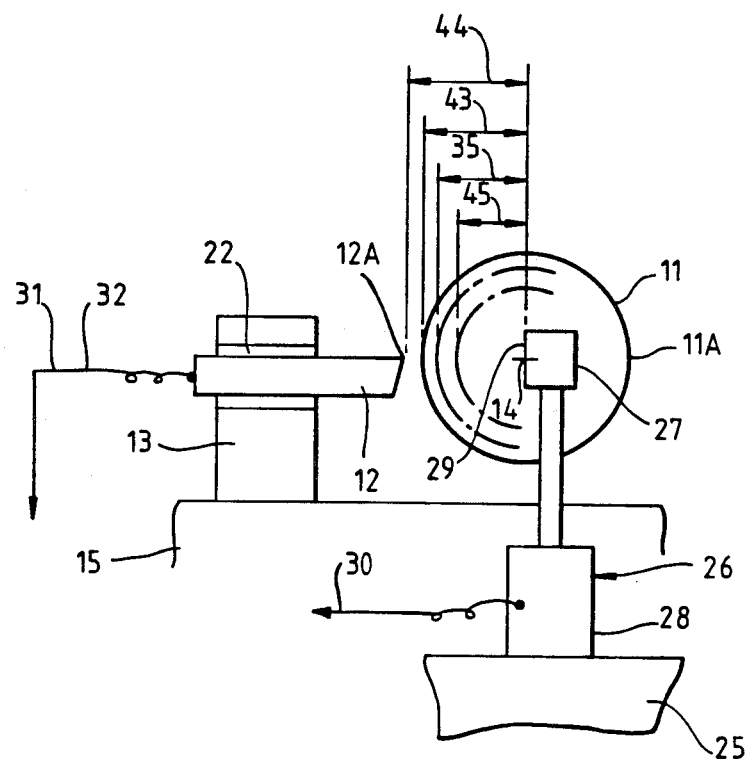
FIG. 2 is an end elevation of FIG. 1.

Referring to FIGS. 1 and 2, the lathe has a holder or chuck 10 supporting a workpiece 11 to be machined at a cylindrical work surface 11A thereof by a cutting tool 12 having a cutting point 12A. The tool is secured to a support 13 mounted on a first slide 15 adapted to be moved transversely to the axis, 14, of the workpiece by a motor 16. A digital control system 17 provides a signal 18 for driving the motor. A position sensor 19 provides a feedback signal 20 for closed loop control of the position of the slide 15.

The slide 15 is supported for its said movement on a second slide 21 in turn supported for movement in the direction of the axis 14 on a bed 25. The slide 21 is adapted to be moved by a closed loop position control means (not shown) analagous to the means 16, 18, 19, 20 associated with the slide 15. A datuming probe 26 has a sensing member 27 supported in a rest position by a housing 28 secured to the bed 25. The member 27 has a datum surface 29 lying in a vertical plane through the axis 14 or in some other selected datum plane.

If the slides 15,21 are moved to engage the cutting point 12A with the surface 29 of the probe 26, the probe 26 outputs a signal 30, signifying that the cutting point is at a datum or zero position.

Wires defining a sensing means including an electrical circuit 31 are connected between the tool 12 and the chuck 10 such that the circuit 31 is established when the cutting point 12A engages the workpiece 11 and disestablished when the point 12A disengages from the workpiece, in either case giving rise to a pulse signal 32. The connection of the circuit 31 to the chuck 10 is shown symbolically by a slip ring 33. The tool itself is supported by insulating plates 22 (FIG. 2) to avoid a short circuit through the slide 15 and the remainder of the machine to the chuck 10.

The control system 17 is arranged to read the position of the point 12A as zero when the point 12A is situated at the axis 14.

Consequently, when the slide 15 is operated to move the tool 12 toward the cylindrical surface 11A of the workpiece, the position of the point 12A at the instant of the signal 32 is a measure of the radius of the surface 11A.

It will be clear that the making or breaking of electrical contact between the tool and the workpiece constitutes an interaction which produces the signal 32 by varying the electrical resistance in the circuit 31.

The control system 17 comprises a tape 34 containing coded digital information defining predetermined positions for the cutting point 12A. The latter information is conveyed by a tape reader 36 through to a digital computer 37 to a register 38. The feedback signal 20 is connected to a counter 39 whose content defines the instantaneous position of the cutting point 12A, the counter having previously been set to zero by the signal 30 by engagement of the point 12A with the datum surface 29 of the datuming probe 26 to establish a datum value. The register 38 and counter 39 are connected to a comparator 40 having an output defining the instantaneous difference between the contents of the register 38 and the counter 39. The output of the comparator 40 constitutes the signal 18 which, as mentioned, is connected to drive the motor 16 to position the slide 15. A corresponding arrangement (not shown) is provided for positioning the slide 21 in accordance with corresponding information defined on the tape 34.

The signal 32 is connected through gates 41 (only one shown) to feed the instantaneous content of the counter 39 to a register 42 whose content, defined by a signal 43B, is adapted to be connected to the computer 37. Referring to the flow diagram of FIGS. 3 and 3A, the computer is programmed to sequentially perform the following steps:

S001: Output a signal 48 connected to advance the tape 34. This presents to the tape reader 36 a code or demand value 35A defining the finished dimension, 35, of the workpiece.

S002: Read and store the code 35A.

S003: Output the code 35A as signal 35B to the register 38 thereby initiating movement of the point 12A toward the workpiece to commence the cutting operation. It is assumed that the point 12A is initially well clear of the workpiece.

S004: Read the signal 18 and decide when the movement is complete i.e. when the signal 18 is zero. This indicates that the cutting operation is finished but at this stage the workpiece does not have the dimension 35 but has a dimension 43 because of deflection of the tool or of the workpiece.

S005: Output the signal 48 to further advance the tape. This presents to the reader 36 a code 44A defining a "pull-back" position 44 of the point 12A clear of the workpiece by an amount known to be greater than said deflection.

S006: Read and store the code 44A.

S007: Output the code 44A as signal 44B to the register 38 thereby to move the point 12A to the position 44.

S008: Simultaneously with outputting the code 44A, output a signal 46 to a gate 47 to connect the circuit 31 to the gate 41 so that on occurrence of the signal 32 the instantaneous content, denoted 43A, of the counter 39 is read into the register 42 when the tool breaks engagement with the workpiece.

S009: Read the content signal 43B of the register 42.

S010: Form the sum 35B−(43B−35B)=45B wherein 43B−35B constitutes said deflection and 45B defines a dimension 45 to which the tool has to be moved for the workpiece to attain the dimension 35.

S011: Output the value 45B to the register 38 to carry out a second cutting operation during which the workpiece can be expected to attain the dimension 35.

S012: Output signal 44B to return to dimension 44. This completes one operating cycle. This cycle is repeated until the difference between 43B and 35B is less than a given tolerance.

It will be appreciated that when electrical contact between the point 12A and the workpiece is broken at step S007 there is no significant mechanical load between the tool and the workpiece. Therefore there is no significant deflection of the workpiece or of the tool such as would falsify the measurement of surface 11A.

Instead of relying on electro-mechanical contact with the workpiece for establishing and disengaging the circuit 31, the presence of the point 12A may be sensed on attaining a predetermined spacing from the surface by any known means such as apparatus for sensing a change in electrical capacitance between the point 12A and the surface, or apparatus for sensing the breakdown of electrical resistance across a predetermined air gap between the point 12A and the surface. In such cases of sensing the surface at a distance therefrom, the computer is programmed to take account of that distance when determining the deflection at step S010 of the program.

The program described is part of a longer program covering both machining and measuring phases in the operation of the machine. In the example described the measuring phase succeeds the machining phase and is intended to take account of deflection during the machining phase. Measuring may of course also take place before machining, e.g. to establish the dimensions of a blank, in which case the tool may be merely moved into engagement with the workpiece to establish the signal 43B, i.e. the actual dimension of the workpiece, e.g. with a view to deciding a safe depth of cut for the first machining operation.

Figure 4:
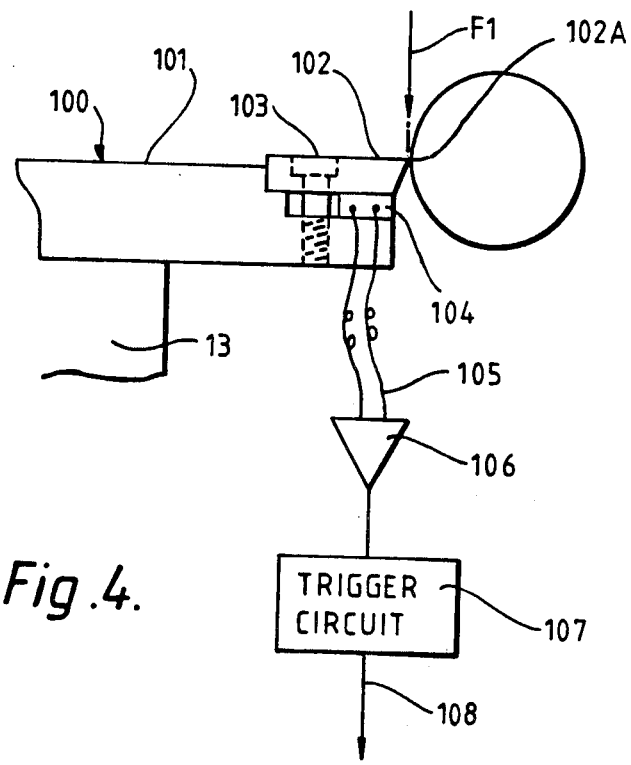
FIG. 4 is a view similar to FIG. 2 but showing a modification.

In a modification (FIG. 4) a tool 100 comprises a shank 101 and a cutting element 102 having the form of a small plate secured to the shank by a screw 103. A piezoelectric crystal 104, placed between the element 102 and the shank 101 is held in compression by the force of the screw 103.

Figure 3:
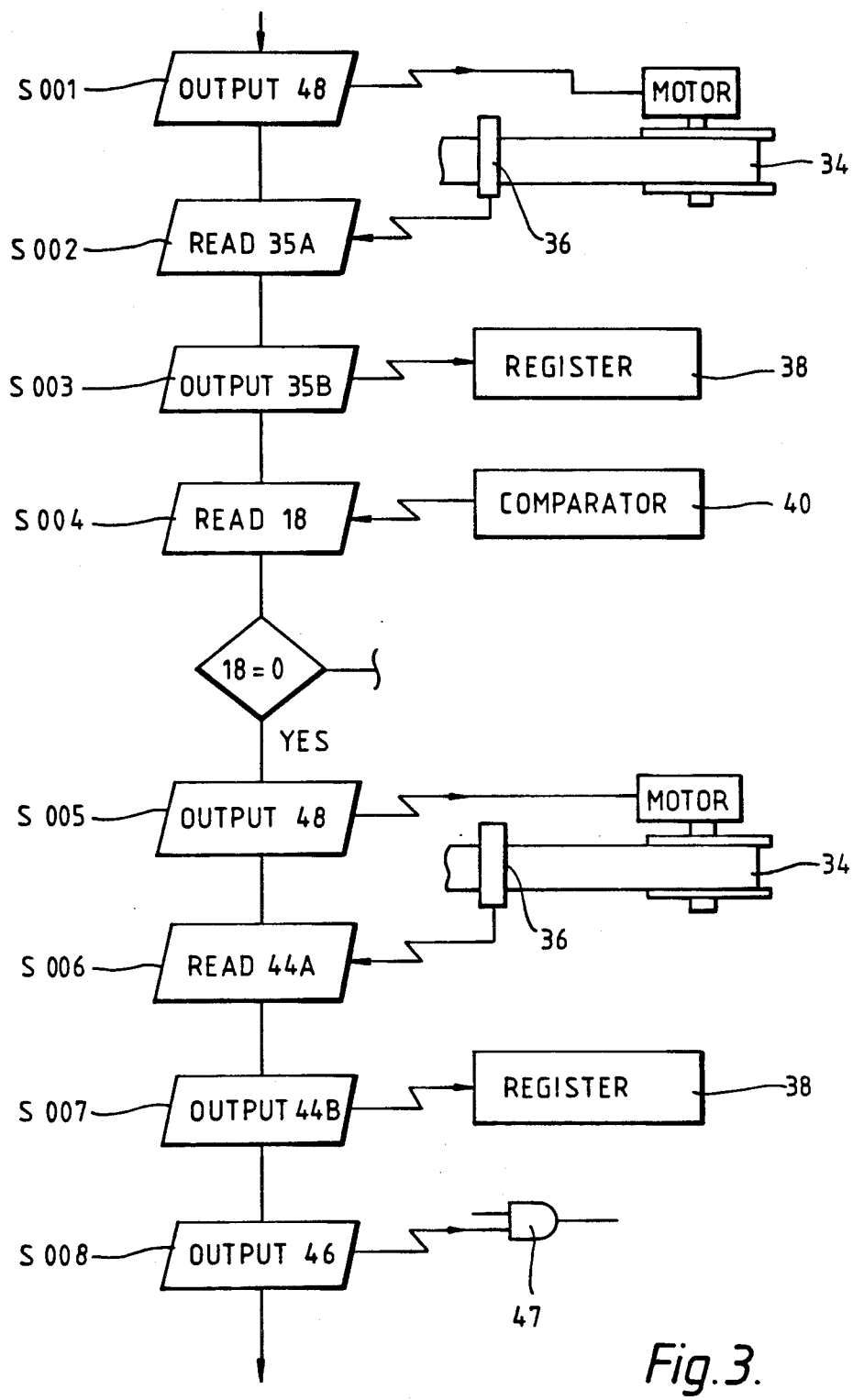
FIG. 3, continued in FIG. 3A, is a flow diagram relating to FIGS. 1 and 2.
Figure 3A:
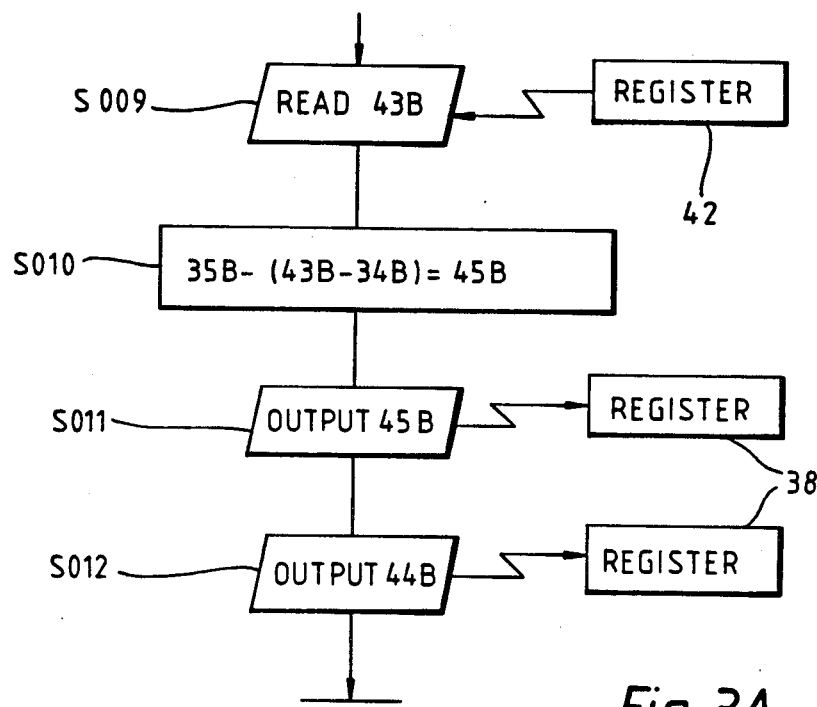

When a cutting force F1 is applied to the cutting point, denoted 102A, the load applied to the crystal increases above that applied by the screw 103 and the crystal generates a corresponding potential in conductors defining an electrical circuit 105 which includes an amplifier 106 and trigger circuit 107 to produce a pulse signal 108 corresponding to the signal 32 described with reference to FIGS. 1 to 3.

Since it is desired not to apply a cutting force between the tool and the workpiece but merely to sense initial engagement between the latter, a very sensitive piezo is used and the amplifier 106 and circuit 107 are selected to respond to forces sufficiently small to signify engagement between the point and the workpiece but not sufficiently large to represent a significant deflection of the tool or of the workpiece.

In this example the sensing interaction is such that a change of force due to mechanical contact is sensed. In other words, the electrical signal 108 is produced during the movement of the tool when the latter engages the workpiece and interacts therewith to produce the force F1 which acts on the crystal 104 to give rise to the signal 108.

It is equally possible to produce the signal 108 when the tool is disengaged from the workpiece at the end of a cutting operation and the cutting force on the tool ceases. In that case the amplifier 106 and trigger circuit 107 produce the signal when crystal 104 outputs a potential during the reduction in the force F1 toward zero as the tool disengages from the workpiece. The crystal potential, which rises during the change in the force toward zero, falls to zero when the force ceases and is therefore a definite indication of the point of disengagement of the tool from the workpiece.

Instead of being situated directly below the element 102, the crystal 104 may be situated in a suitable location between the tool 100 and the support 13.

In a further modification (FIGS. 5,6) a tool 200 is supported on the support 13 for motion in a direction Y (FIG. 5) transverse to the direction X of the axis 14. During such motion the tool is guided against displacement in the direction X by a pair of leaf springs 201 and against displacement in a direction Z transverse to the directions X,Y by the support 13 and by the head 202 of a clamp bolt 203. The tool 200 is biased toward the workpiece 11 by a light spring 204 which holds the tool against a stop 204A. The clamp bolt is connected to a cam 205 acting against an under-surface 206 of the support 13 to hold the tool against displacement in the direction Y under a component force FY acting on the tool when cutting. The clamp bolt is releasable by a hydraulic actuator 207 connected to rotate the cam. The actuator is controlled by a valve 208 operated electromagnetically by a signal 209B derived from a code 209A (FIG. 1) on the tape 34 together with the code 44A. The tool has an extension which is a movable core 211 of a differential transformer 210, having an output signal 212 which is set to be zero when the tool rests against the stop 204A.

The operation of the tool is similar to that described with reference to FIGS. 1,2 in that the tool is withdrawn to the dimension 44 and then fed into engagement with the workpiece. However, in the present example the clamp bolt is released by the signal 209B when the tool is at the dimension 44 so that when the tool is fed back to the dimension 35, the tool slides on the support 13 from the instant at which the tool engages the workpiece at the dimension 43. As the support moves to bring the tool to the position 35, the resulting displacement between the tool and support is indicated by the transformer 210 and is a direct indication of the amount by which the tool position must be corrected to produce the dimension 35. The signal 212 is taken through a digitizer 213 to produce a signal 211B connected to be read by the computer in a way corresponding to the reading of the signal 43B at step S009 of the program. But in the present example the steps S009, S010 are replaced by the following:

S209: Read signal 211B

S210: Form the sum 35B−211B=45B

Figure 6:
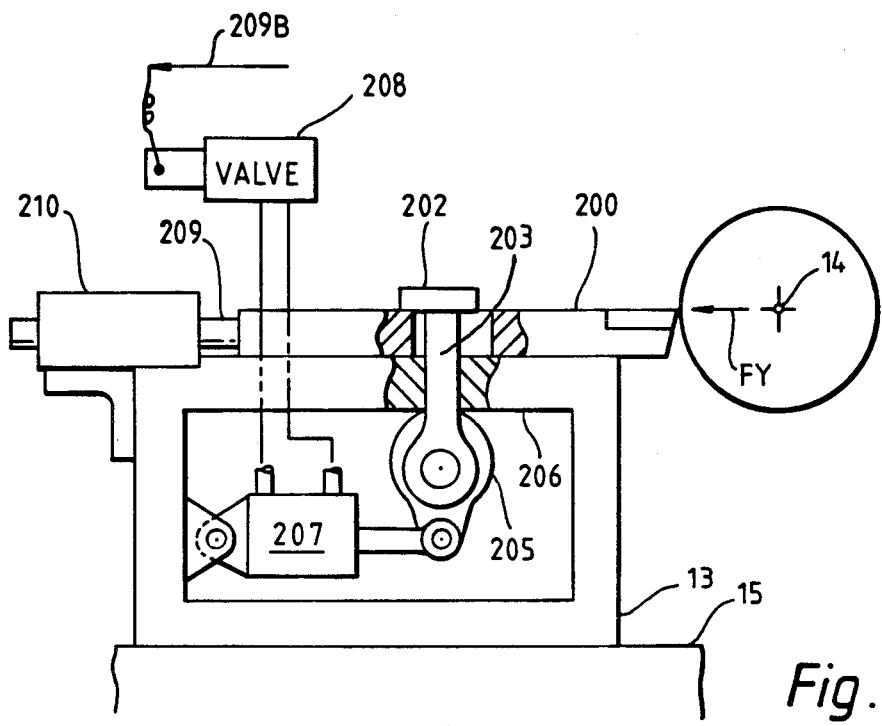
FIGS. 5 and 6 are views similar to FIGS. 1 and 2 but show a further modification.
Figure 5:
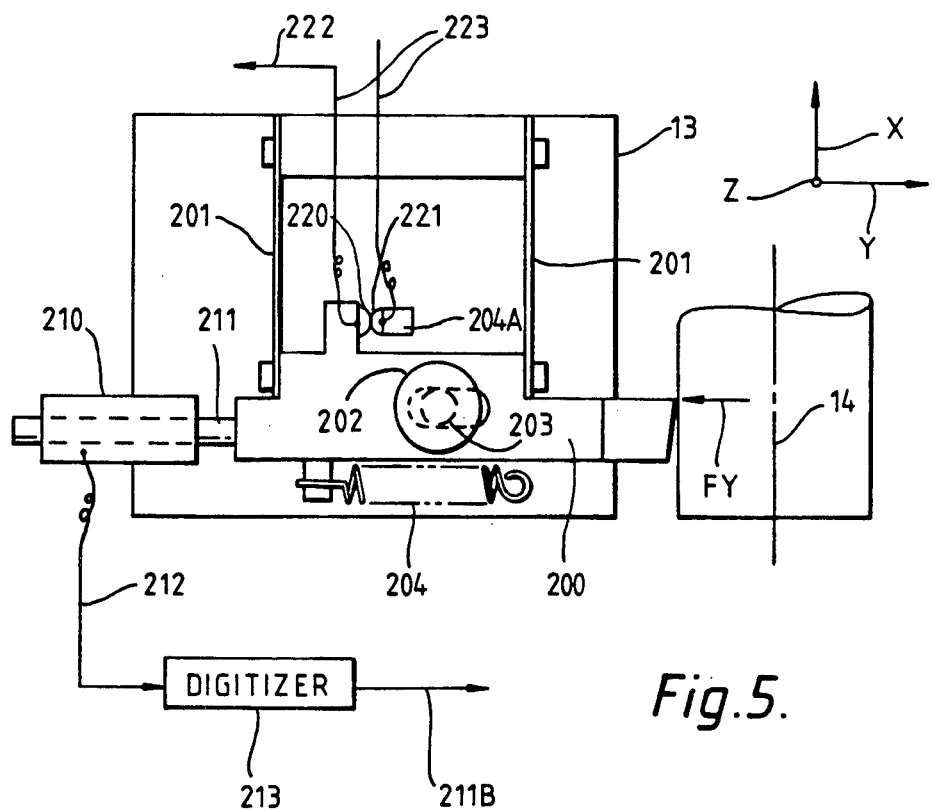

Instead of the transformer 210, the arrangement shown in FIGS. 5,6 may comprise a pair of electrical contacts 220,221 defined respectively on the tool 200 and the stop 204A. Conductors defining a circuit 223 are connected to the contacts 220,221, and when the tool 200 is moved against the spring and the contacts 220,221 become separated, the state of the circuit changes to produce a signal 222 connected and used in the same way as the signal 32 described with reference to FIGS. 1 to 3 and 3A.

I claim:

1. Method of machining a work surface of a workpiece on a numerically controlled machine tool; the machine tool comprising two members supporting respectively the workpiece and a tool for machining the work surface, means for moving one of the members relative to the other thereby to move the tool and the workpiece one relative to the other, means defining a datum surface on the member supporting the workpiece, the work surface when finished having a distance from the datum surface defining a demand value; the method comprising the steps of:

(a) storing said demand value, (b) determining a datum value, said datum value corresponding to the relative position of the members when the tool is at the datum surface, (c) relatively moving the members with respect to said datum surface to perform a machining operation to produce an actual work surface, (d) relatively moving the members into a position at which there is no significant deflection of the tool with respect to the actual work surface, (e) determining the relative position of the members at the position described in step (d) to define a feedback value, (f) determining the difference between the demand and the feedback values to define an error value, (g) algebraically adding said error value to the demand value, and (h) repeating steps (c) to (g) until the error value lies within a given tolerance.

2. Method according to claim 1 wherein step (d) comprises one of the actions of establishing and disestablishing contact between the tool and the work surface.

3. Numerically controlled machine tool comprising a first and a second member which, in operation, support respectively a workpiece having a work surface and a tool for machining the work surface, means for moving the members one relative to the other, measuring means for measuring the distance between the members during relative movement thereof, means defining a measured distance between the members, circuit means for generating a pulse signal responsive to the tool attaining, during relative movement of the members, an operational relationship with the work surface at which there is no significant deflection of the tool with respect to the work surface, means defining a datum position on the member supporting the workpiece, means for storing a demand value defining a demand position of the work surface relative to the datum position, means for moving the members between a first position at which the tool has said datum position and a second position in which the measured distance between the first and second positions defines said demand value, means for determining the measured distance between the members at the instant of said pulse signal thereby defining a feedback value, means for determining the difference between the demand and feedback values to define an error value, and means for algebraically adding the error value to the stored demand value.

4. Apparatus according to claim 3 wherein the tool and the workpiece are connected in said circuit means to vary the resistance thereof when the cutting point makes or breaks contact with the workpiece.

5. Apparatus according to claim 3 comprising means for supporting the tool on said second member for movement relative thereto in response to a force exerted on the tool by contact thereof with the work surface, means for releasably locking the tool against a said movement, and means for producing said pulse signal responsive to a said movement.

6. Apparatus according to claim 5 comprising means for producing said pulse signal responsive to said movement commencing on engagement between the tool and the surface.

7. Apparatus according to claim 5 comprising means for producing said pulse signal responsive to said movement ending on disengagement of the tool and the surface.

8. Apparatus according to claim 5 comprising means responsive to said movement for producing an output signal varying according to the extent of said movement, and means for generating said pulse signal responsive to said output signal attaining a predetermined magnitude.

9. Apparatus according to claim 3 comprising means arranged between the tool and the second member for sensing strain due to a force applied between the tool and the workpiece, and means for producing said signal responsive to a change in said strain due to occurrence of said force on engagement between the tool and the work surface or due to cessation of said force on disengagement between the cutting point and the surface.

10. Apparatus according to claim 9 wherein said means for sensing strain comprises a piezo-electric crystal.

11. Apparatus according to claim 10 wherein said tool comprises an element defining a cutting edge and a body to which the element is secured, and wherein said crystal is arranged between the element and the body.

12. A method of machining the surface of a workpiece mounted on a numerically controlled machine tool, said machine tool having a cutting tool attached thereto which can be displaced relative to the surface of said workpiece, the cutting tool being employed for both machining said workpiece and sensing the location of the surface thereof, comprising the steps of storing a first signal corresponding to the desired distance of the finished machined surface of said workpiece from a datum plane;

generating a second signal corresponding to the actual distance of said cutting tool from said datum plane;

moving at least one of said cutting tool and said workpiece with respect to each other to machine the surface of said workpiece to a first distance from said datum plane at which said first signal is equal to said second signal, said first distance being greater than said desired distance by an amount equal to the relative deflection of at least one of said cutting tool and said workpiece with respect to each other;

moving at least one of said cutting tool and said workpiece for separation of one from the other;

generating a third signal when said cutting tool breaks engagement with said workpiece, said third signal corresponding to said first distance;

determining the difference between said third and first signals, said difference being a deflection signal corresponding to the relative deflection between said cutting tool and said workpiece;

generating a fourth signal equal to the difference between said first signal and said deflection signal; and moving at least one of said cutting tool and said workpiece with respect to each other to machine said workpiece to a distance from said datum plane at which said second signal equals said fourth signal, said cutting tool thereby machining the surface of said workpiece to the desired distance from said datum plane.

13. A numerically controlled machine tool comprising a first member for supporting a workpiece;

a second member for supporting a cutting tool, said cutting tool being provided for machining the surface of said workpiece to a desired distance from a datum plane;

motor means for displacing said first and second members with respect to each other;

storage means for storing a first signal corresponding to said desired distance from said datum plane;

position detection means for generating a second signal corresponding to the displacements of said first and second members relative to each other;

comparator means having inputs coupled to the outputs of said storage and position detection means and an output coupled to said motor means, said comparator means driving said motor means to displace said first and second members with respect to each other until said first and second signals are equal;

sensing means coupled to said first and second members for determining when said cutting tool and workpiece became disengaged from each other, said sensing means generating a third signal corresponding to the distance of the surface of said workpiece from said datum plane upon said disengagement;

computer means coupled to said storage and sensing means for generating a deflection signal corresponding to the difference between said third and first signals, said difference being a deflection signal corresponding to the relative deflection between said cutting tool and said workpiece, said computer means further generating a fourth signal equal to the difference between said first signal and said deflection signal and inputting said fourth signal to said storage means, whereby said comparator drives said motor means to displace said first and second members with respect to each other until said fourth and second signals are equal to each other, said cutting tool thereby machining the surface of said workpiece to the desired distance from said datum plane.

* * * * *